Dec. 26, 1944. M. C. TERRY ET AL Re. 22,584

SELF-CONTAINED AIR CONDITIONER

Original Filed Jan. 11, 1940 4 Sheets-Sheet 1

Inventors
Matson C. Terry
Paul Komroff

By Malcolm W. Fraser

Attorney

Dec. 26, 1944. M. C. TERRY ET AL Re. 22,584

SELF-CONTAINED AIR CONDITIONER

Original Filed Jan. 11, 1940 4 Sheets-Sheet 2

Inventors
Matson C. Terry
Paul Komroff

By Malcolm W. Fraser
Attorney

Dec. 26, 1944. M. C. TERRY ET AL Re. 22,584

SELF-CONTAINED AIR CONDITIONER

Original Filed Jan. 11, 1940 4 Sheets-Sheet 3

Inventors
Matson C. Terry
Paul Komroff

By Malcolm W. Fraser

Attorney

Dec. 26, 1944. M. C. TERRY ET AL Re. 22,584

SELF-CONTAINED AIR CONDITIONER

Original Filed Jan. 11, 1940 4 Sheets-Sheet 4

Inventors
Matson C. Terry
Paul Komroff

By Malcolm W. Praeger

Attorney

Reissued Dec. 26, 1944

Re. 22,584

UNITED STATES PATENT OFFICE 22,584

SELF-CONTAINED AIR CONDITIONER

Matson C. Terry, Abington, Pa., and Paul Komroff, Flushing, N. Y., assignors, by mesne assignments, to General Motors Corporation, a corporation of Delaware Original No. 2,309,224, dated January 26, 1943, Serial No. 313,410, January 11, 1940. Application for reissue January 24, 1944, Serial No. 520,080

28 Claims. (Cl. 62—129)

This invention relates to room cooling and ventilating apparatus but more particularly to a self-contained unit having a cooling system embodying condenser, evaporator and compressor devices and which are adapted to deliver conditioned air to a room or other space.

An object is to produce apparatus of the above character which is adapted to introduce tempered outside air into the space to be conditioned during cool or cold weather by means of "inverted refrigeration" wherein room air is passed through the evaporator and thence to the outside, and outside air is simultaneously passed through at least a portion of the condenser and introduced into the space to be conditioned.

Another object of this invention is to produce an apparatus of the above character which is simple and inexpensive in construction and embodies a damper plate which can be selectively moved to one of several positions thereby to adapt the unit for different purposes such as cooling, ventilating or exhausting.

A further object is to produce a simple and efficient apparatus of the above character which can be readily adapted by changing the position of baffle or damper plates to enable the apparatus to be used for air cooling, ventilating, tempered ventilating or exhausting purposes.

A still further object is to enable apparatus of the above character when used for air tempering purposes or for the purpose of delivering warm air, to be thermostatically controlled in such manner that the air passing through the evaporator coils is automatically maintained at such temperature that liability of frosting of the evaporator coils is prevented.

A still further object is to produce a simple and efficient apparatus of the above character which can be conveniently mounted in a window opening and which has the novel features of construction and arrangement enabling it to be inexpensively manufactured and to occupy a minimum amount of space.

Other objects and advantages of the invention reside in details of construction, operation and arrangement of parts as will be hereinafter more specifically set forth.

Embodiments of the invention are shown by way of illustration but not of limitation on the accompanying drawings in which.

Figure 2:
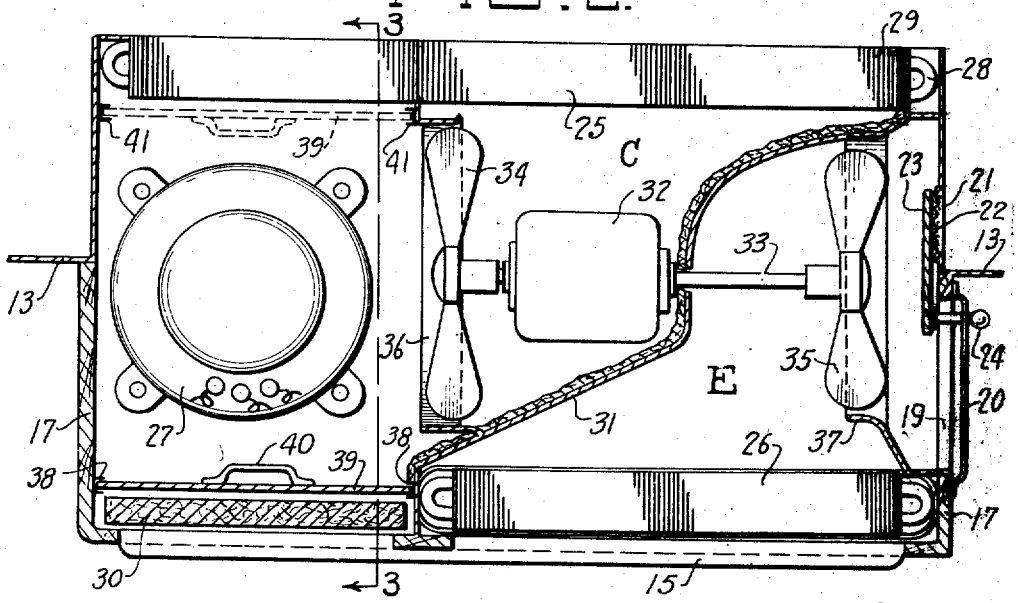
Figure 2 is an enlarged horizontal sectional view of the unit shown on Figure 1.
Figure 4:
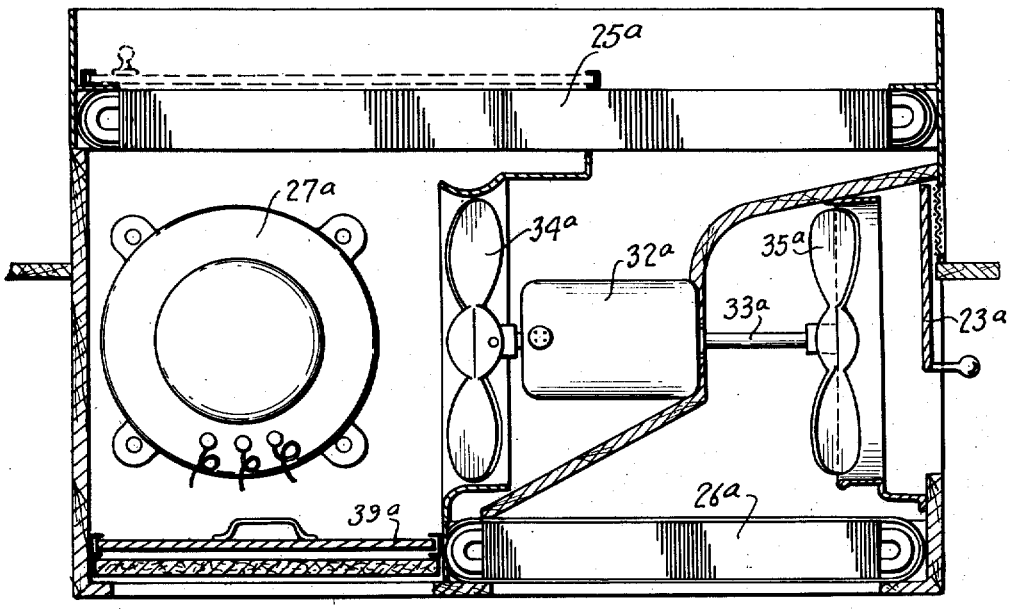
Figure 4 is a horizontal or longitudinal sectional view of an alternate form of window unit which can be adapted for use in addition to an air cooler and ventilator also for the purpose of warming or tempering air.
Figure 3:
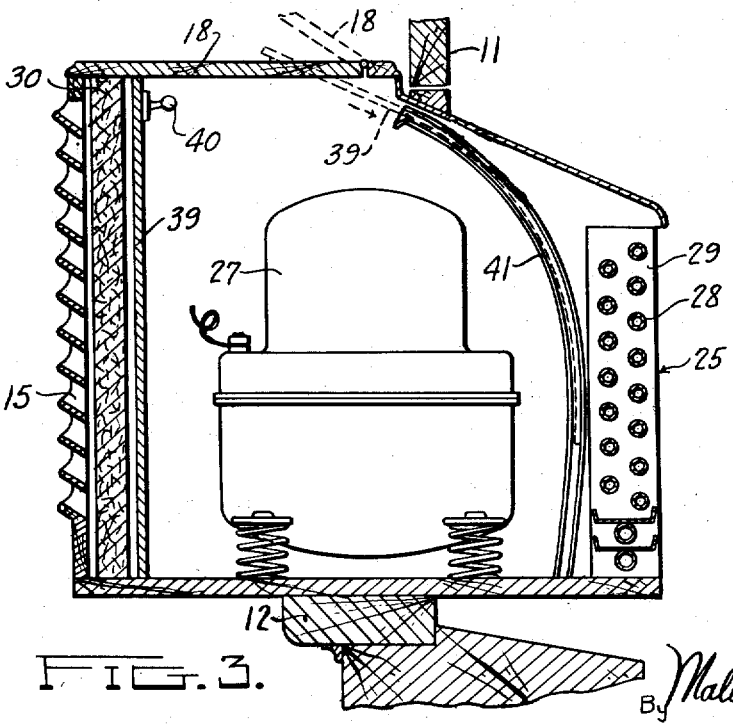
Figure 3 is a vertical sectional elevation substantially on the line 3—3 of Figure 2 showing particularly the manner in which the baffle plate is moved into position adjacent the condenser.
Figure 5:
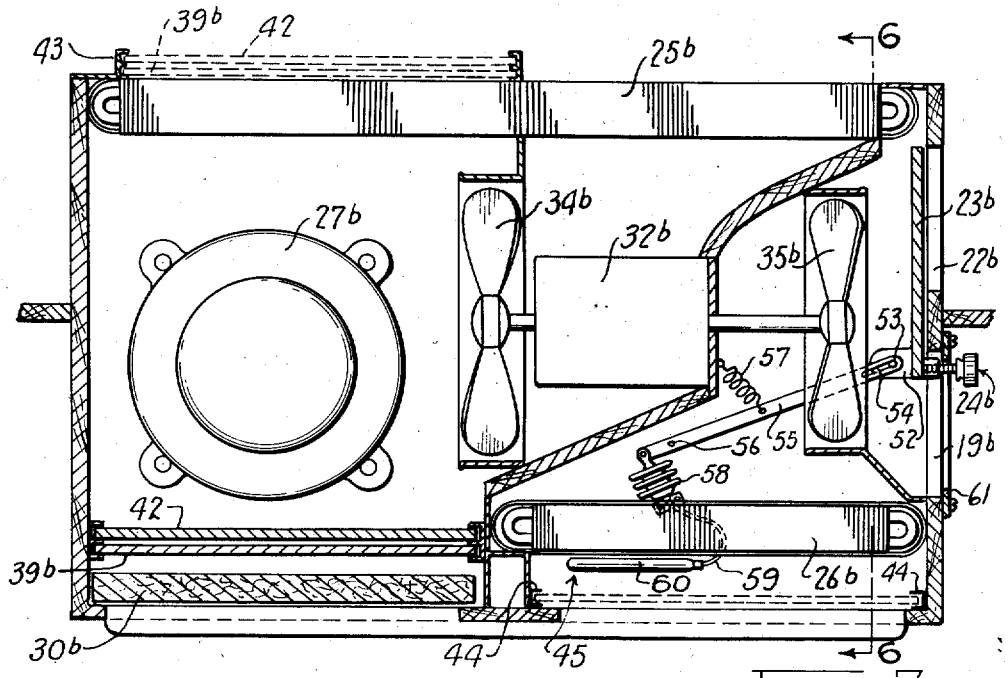
Figure 5 is a horizontal or longitudinal sectional view of another form of window unit in which temperature responsive means controls the air delivered to the cooling coils when the unit is employed for air warming or tempering purposes.
Figure 11:
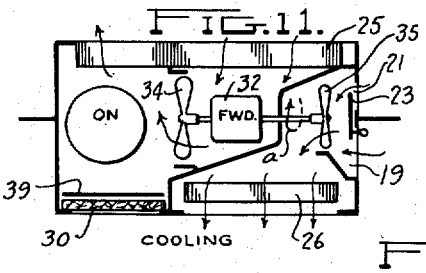
Figure 12:
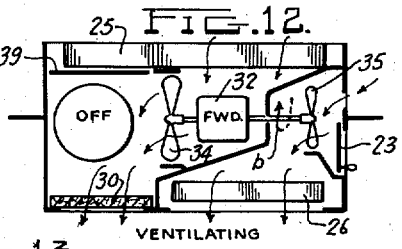
Figure 13:
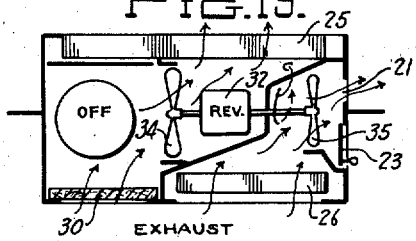

Figures 11, 12, and 13 are diagrammatic views showing the unit illustrated on Figures 2 and 3 adjusted for purposes of air cooling, ventilating and exhausting respectively;

Figures 14, 15, 16 and 17 are diagrammatic views of the unit shown on Figure 4 adjusted for air cooling, ventilating, tempered ventilating and exhausting respectively.

Figure 1:
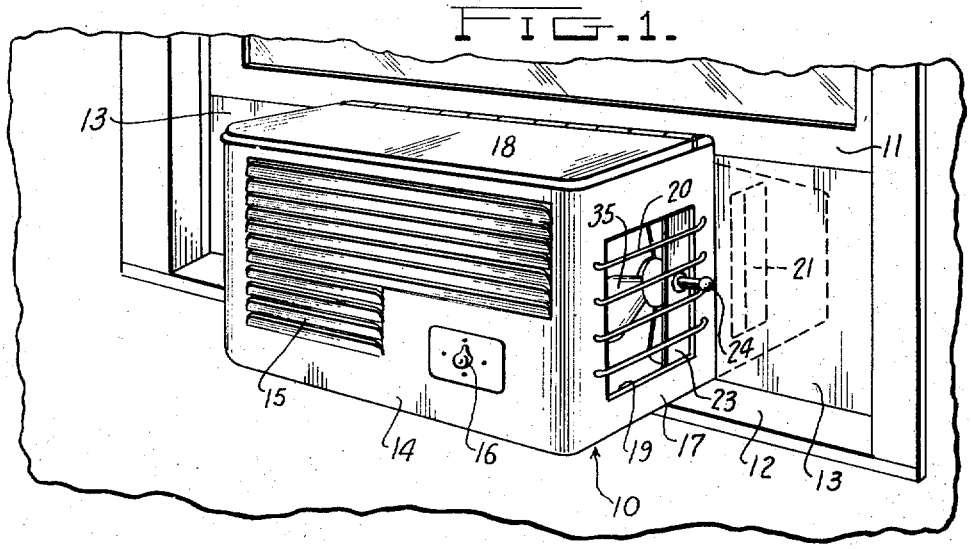
Figure 1 is a front perspective view of a combined ventilating and cooling unit mounted in a window opening.

The illustrated embodiment of the invention comprises a window unit indicated generally at 10 which is mounted in a window opening provided by first raising the window sash 11 sufficiently to admit the rear portion of the unit, the base resting on the window sill 12. The unit is disposed centrally of the opening and the open portions on opposite sides of the unit are closed by panels 13 suitably secured in place. The unit comprises a cabinet having a front wall 14 provided with a plurality of horizontal louvres 15 which are, in this instance, arranged to direct the air discharged therefrom at an upward angle or toward the ceiling of the room to be ventilated or cooled. A portion of the front wall 14 is free of louvres and is equipped with a control knob 16 selectively movable to different positions for controlling the operation of the fans and cooling unit disposed within the cabinet. It will be understood that the knob 16 is operatively connected to any suitable form of switch so that by turning the knob the refrigerating machine and the fan motor may be simultaneously energized, or that the fan motor may be operated independently of the refrigerating machine; also that the fan motor may be rotated in the desired direction as will hereinafter more fully appear. The cabinet also has side walls 17 and a hinged top wall 18, the hinge being at the rear portion so that the cover may be swung upwardly from the inside of the room to afford access to the inside of the cabinet. As indicated by the broken lines on Figure 1, the portion of the cabinet which projects outside of the window has a tapered top wall and the extreme outer end of the cabinet is open as indicated particularly on Figure 3.

Formed in one side wall 17 on the inside of the room is an opening 19 protected by a series of horizontally disposed rods 20. Formed in the portion of the side wall disposed on the outside is an air opening 21 which is protected by a screen 22. It will be observed that the openings 19 and 21 are juxtaposed to each other and a sliding damper 23 having an operating knob or handle 24 controls both openings. It will be apparent that the damper 23 can completely close off the opening 22 or materially restrict the opening 19 or it can be moved to such position as to close off a portion of each of these openings. This enables all outside air or all inside air or a mixture of outside and inside air to be drawn into the cabinet as will hereinafter appear.

Arranged inside of the cabinet 10 is a compressor type refrigerating machine of the type including a condenser 25 and evaporator or cooling coil 26 and a motor compressor unit 27. Since the construction and operation of these parts form no part of the present invention and are well-known to those skilled in this art, further description and illustration is not considered necessary. Suffice it to say that the condenser is made up of a series of coils 28 arranged in vertically spaced relation (Figure 3) and a plurality of vertically disposed, closely spaced fins or plates 29 to receive the coils 28. As shown the condenser 25 covers substantially the entire opening at the rear end of the cabinet. The cooling coil is disposed at the front end of the unit and is arranged vertically to cover a substantial portion of the front portion thereof closely arranged to the louvres 15. The remaining portion of the front opening of the cabinet is covered by a suitable filter 30.

The motor-compressor unit 27, the condenser 25 and the cooling coil 26 are connected together by suitable tubing, not shown. A suitable refrigerant expansion means, not shown, such as a thermostatic expansion valve or capillary restrictor tube is located in the refrigerant circuit between the outlet of the condenser 25 and the inlet of the cooling coil 26 in a manner well understood to those skilled in the refrigeration art.

As shown, the inside of the cabinet is divided into two compartments by a wall or partition 31 having suitable insulation. This wall extends in an irregular manner from the front wall between the filter 30 and the cooling coil 26 and thence rearwardly in an inclined fashion terminating near one end of the condenser 25. This separates the cabinet into an evaporator chamber E and a condenser chamber C.

In this instance, an electric motor 32 is disposed within the condenser chamber C and has its armature shaft 33 projecting beyond opposite ends and in a direction longitudinally of the cabinet. Secured to one end of the shaft 33 and disposed within the condenser chamber C is a radial bladed or propeller type fan 34 and fixed to the opposite end of the shaft 33 and positioned within the evaporator chamber E is a similar fan 35, the latter being somewhat smaller than the fan 34. The blades of the fans 34 and 35 are similarly inclined so that in the operation of the motor 32 which is a reversible motor, the fans create streams of air extending in the same direction. About the fan 34 is a shroud 36 which is connected to the partition 31 and also to the edge of one of the fins 29 of the condenser. About the fan 35 is a shroud 37 and it will be observed that the fan 35 is juxtaposed to the air openings 19 and 22 so as to draw in air through one or both of such openings or discharge air therethrough as will hereinafter appear.

Suitably mounted in the chamber in rear of the filter 30 are channels or guides 38 adapted to receive side edges of a plate or damper 39 having a handle 40. When in place in the guides 38 the damper 39 blocks the passage of air into the room through the filter 30.

By lifting the hinged cover 18 of the cabinet, the handle 40 may be grasped to remove bodily the damper from the guides 38. As indicated on Figure 3, in the rear portion of the cabinet is a rearwardly and downwardly curved guide 41, it being understood that a similar guide is attached to the plate in which the fan shroud 36 is mounted. The guides 41 enable the damper 39 when the cover 13 is swung upwardly, to be fitted into the guides 41 so that opposite side edges of the panel engage respectively guides 41. The damper 39 then may be forced rearwardly and downwardly along the guide 41 to assume a position directly in front of the left-hand portion of the condenser 25 substantially as indicated by the broken lines on Figure 2. The damper 39 is preferably of material sufficiently flexible to enable it to accommodate itself to curvilinear guides of this type.

The operation of the above described apparatus is diagrammatically illustrated in Figures 11 to 13. In Figure 11, it will be noted that the damper 39 is disposed in rear of the filter 30 so as to shut off the passage of air through the filter. The cooling apparatus is rendered operative and the fan motor 32 which is controlled independently of the cooling apparatus is operated to drive the fans 34 and 35 in the direction of the arrow *a*. The fan 34 draws in air from the outside over a portion of the condenser as indicated by the arrows, thus imparting a cooling influence to the condenser. It will be observed that the air is drawn in through the right-hand side of the condenser and discharged through the left-hand side of the condenser. The slide damper 23 is moved to such position that a portion of the air may be drawn from the room through the opening 19 and another portion through the opening 21. The air drawn into the evaporator chamber by the fan 35 is forced over the cooling coil 26 and into the room, thereby supplying cooled air to the room. Of course, the slide damper 23 may be adjusted to one position or another to control the air drawn in by the fan 35.

When it is desired to use the apparatus for ventilating purposes, the damper 39 is disposed in the position shown on Figure 12 or in front of the left-hand portion of the condenser 25. In this instance, the cooling apparatus is shut off and the fan motor 32 is operated to rotate the armature shaft in the direction of the arrow *b* which is the same as that shown on Figure 11. The air drawn in by the fan 34 is forced into the room through the filter 30 and the air drawn in by the fan 35 is forced through the cooling coil 26 and into the room. Thus it will be apparent that both fans 34 and 35 operate conjointly to deliver air to the room when the apparatus is used for ventilating purposes. In this instance, the slide damper 23 is moved to such position as to shut off the room air so that all outside air is discharged into the room.

In some instances, it is desirable to utilize an apparatus for exhausting air from the room, as, for example, where the room is filled with smoke. Referring to Figure 13, it will be understood that the parts are arranged similarly to the showing on Figure 12. However, in this case, the fan motor 32 is reversed, thereby causing fans 34 and 35 to rotate in the opposite direction or in the direction indicated by the arrow *c*. This reverse rotation of the fans creates streams of air from the room through the filter 30 and cooling coil 26 and out through the right-hand portion of the condenser 25 and the outside opening 21 respectively, the slide damper 23 being disposed in position to close the opening to the inside of the room.

The alternate form of the invention shown on Figure 4 is similar to that above described with the exception that the fan **34*a* has its blades differently inclined or pitched so that in the operation of the reversible motor 32*a* the fans 34*a* and 35*a* work in opposite directions and the longitudinal thrust imparted by the fans in the operation of the motor is in opposite directions, this being one of the advantages of the arrangement in that it reduces the thrust imposed on the motor shaft 33*a*. In this instance, the removable damper panel 39*a* is turned 90° to enable it to be mounted in the guides in rear of the condenser 25*a*, the guide channels being separated from each other sufficiently to accommodate the damper in that position. It will also be observed that the shroud for the fan 34*a*** has a lateral extension reducing the size of the opening through the condenser on the right-hand portion of the figure. This is of importance in increasing the velocity of air discharged from the unit when employed for cooling purposes (Figure 14) and reduces the area of the condenser through which air passes when the unit is used for tempered ventilating (Figure 16).

Figure 14:
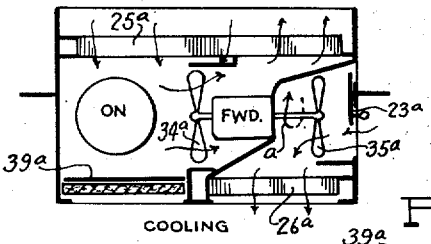
Figure 15:
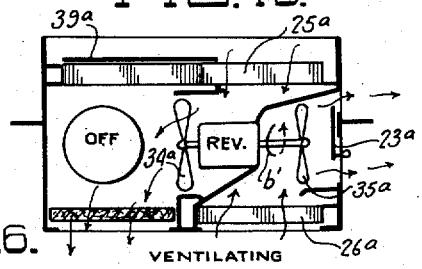

The operation of the apparatus shown on Figure 4 is diagrammatically illustrated on Figures 14 to 17 inclusive. Figure 14 shows the apparatus used for air cooling purposes, the cooling apparatus operating as well as the fans. The latter rotate in the direction of the arrow *a*. From a comparison of the arrows on Figure 14 and those on Figure 11, it will be observed that the only difference is that the condenser fan **34*a* operates to draw in air from the outside through the left-hand portion of the condenser and discharge it through the right-hand portion of the condenser. This operation is due, as will be readily understood, to the change in the angularity or pitch of the blades of the fan 34*a*. Figure 15 shows the apparatus used for ventilating purposes and comparing that figure with Figure 12, it will be noted that the baffle or damper plate 39*a* is similarly arranged, although the slide damper 23*a*** is adjusted to an intermediate position uncovering a portion of the openings leading to the inside of the room and to the outside. The fans are driven in the direction of the arrow *b'* or in a direction opposite to that shown in Figure 12. As a result the fan **34*a* discharges air into the room similar to the showing on Figure 12 but the evaporator fan 35*a*** draws air from the inside of the room, and, as shown, discharges a portion outside and another portion is returned to the room.

Figure 16:
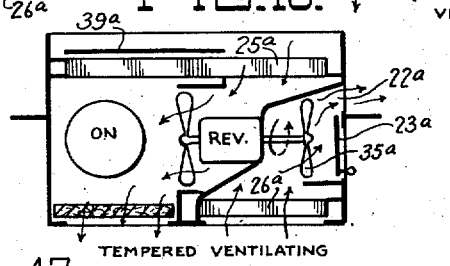
Figure 17:
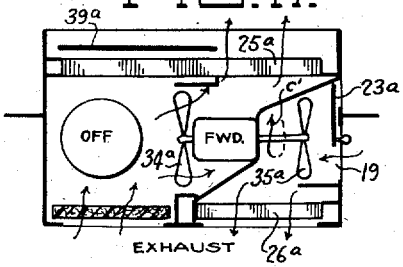

The parts shown on Figure 16 are disposed similarly to the arrangement shown on Figure 15, the fans being driven in the same direction. However, in this case the cooling apparatus is operated and as a result air drawn in from the outside is warmed or tempered in passing over the right-hand portion of the condenser **25*a*. The air will also pick up by radiation some heat from the left-hand portion of the condenser. The room air passes over the evaporator 26*a* and imparts its heat thereto and is then discharged to the outside through the opening 22*a*. It will thus be apparent that the source of heat is derived from the air from the inside of the room upon passing through the evaporator and thence to the outside, this being of particular advantage in that the accumulation of frost on the evaporator coils is prevented. As a further use of this apparatus, Figure 17 illustrates its operation for exhausting purposes by which air from the inside of the room is exhausted to the outside. The operation of the apparatus in this case is somewhat different from that shown in Figure 13 in that the evaporator fan 35*a* draws air from the inside of the room through the opening 19 and passes it over the cooling coil 26*a*** to the inside of the room, the fans being operated in the direction of the arrow *c'* which is opposite to the direction of rotation of the fans according to Figure 13.

From the above description with respect to the apparatus shown in Figure 4 it will be apparent that the unit may be used for air cooling purposes, for ventilating purposes, for warming air introduced into the room and for exhausting air from the room. It will be understood that the cooling apparatus is operated only when the apparatus is used for air cooling or tempered ventilating purposes. By enabling the apparatus to have such a variety of uses, its usefulness is of much wider scope and during greater portions of the year.

Figure 6:
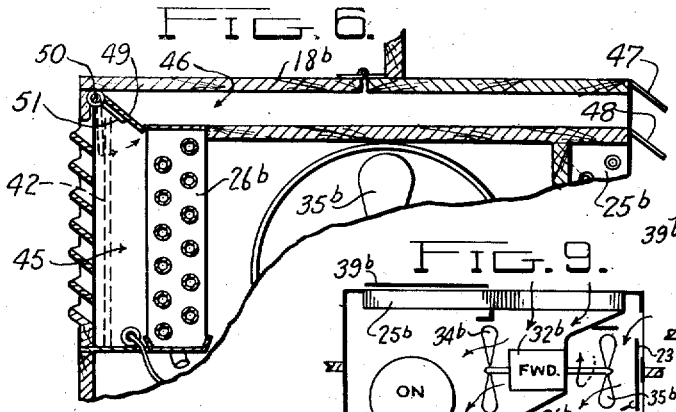
Figure 6 is a fragmentary sectional elevation on the line 6—6 of Figure 5 showing particularly the air discharge duct and control damper therefor.

In the alternate form of the invention shown on Figures 5 to 10, the condenser **25*b*, motor compressor unit 27*b* and evaporator 26*b* is similarly arranged. Also the reversible motor 32*b*, condenser fan 34*b* and evaporator fan 35*b* are similar in structure and operation to the form of the invention shown on Figures 2 and 11 to 13. In this instance, in addition to the damper plate 39*b* is a similar damper plate 42 which is conveniently mounted directly in rear of the damper 39*b* with the side edges mounted in similar guides. Arranged directly in rear of the left-hand portion of the condenser 25*b* are guides 43 to receive the damper plates 39*b* and 42 after they have been turned through a 90° arc as described in connection with Figure 4. Arranged in advance of the cooling coil 26*b*** is a pair of guides 44 which are adapted to receive one of the damper plates 39b and 42. It will be observed that the cooling coil 26b is spaced a slight distance rearwardly of the guides 44 to provide with a baffle plate, when the latter is in place, a vertical passage 45 which communicates at its upper end with a horizontal passage or duct 46 which extends rearwardly having an open rear end communicating with the outside, a rain shield 47 being disposed at the rear end of the passage 46. A similar shield 48 extends outwardly beyond the top of the condenser coil 25b. At the juncture of the passages 45 and 46 is a flap valve 49 which is mounted on a horizontal pivot 50 and has a spring 51 for holding the valve normally seated to seal the duct 45 from the duct 46. When the baffle plate, such as the plate 42, is inserted in its guides 44 after the cover 18b has first been swung upwardly, the valve 49 is engaged by the damper plate 42 and swung to its open or dotted line position (Figure 6).

Figure 7:
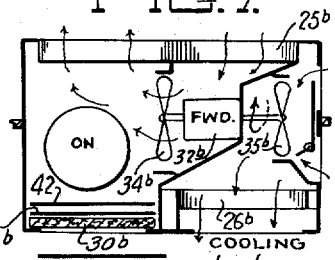
Figure 7 is a diagrammatic view showing the operation of the unit illustrated on Figures 5 and 6 when used for air cooling purposes.
Figure 9:
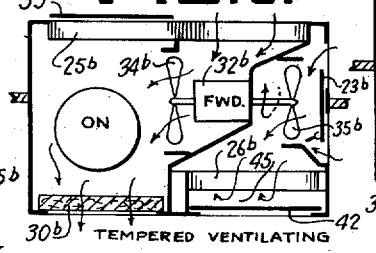
Figure 9 is a view similar to Figures 7 and 8 showing the unit adjusted for use as an air warming or tempering device.
Figure 8:
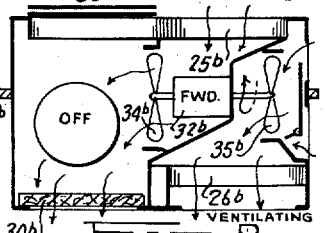
Figure 8 is a view similar to Figure 7 but showing the unit adapted for use as a ventilator by which air is forced into the room for ventilating purposes.

Referring now to the diagrammatic views 7 to 10, inclusive, it will be understood that Figure 7 shows an arrangement of the parts when the apparatus is used for air cooling purposes. In that form the damper plates 42 and 39b are disposed in their guides in rear of the filter 30b, the fans and other parts operating in accordance with the above description in connection with Figure 11. The cooling apparatus is placed in operation and the fan 34b draws in air through the right-hand portion of the condenser 25b and discharges the same through the left-hand portion of the condenser. The evaporator fan 35b draws in air through one or both of the side openings and forces the same through the evaporator 26b and into the room. When the apparatus is used for ventilating purposes, the baffles 39b and 42 are removed from their position directly in rear of the filter 30b and inserted into the guides 43 in rear of the left-hand portion of the condenser. It will be apparent that the apparatus then is adapted to operate similarly to that described in connection with Figure 12, both fans operating to draw in outside air and discharge the same into the room.

When it is desired to use the apparatus for tempered ventilating purposes or for warming air discharged into the room, the damper plate 39b is disposed in rear of the left-hand portion of the condenser 25b. The damper 42 is disposed in the guides 44 in advance of the evaporator 26b. The cooling apparatus is then operated and also the fans are placed in operation. The condenser fan 34b then draws in air through the right-hand portion of the condenser 25b, the air thus being warmed or tempered and such air is then discharged into the room through the filter 30b. On the other hand, the evaporator fan 35b operates to draw in outside air, inside air or a mixture of outside and inside air as will hereinafter appear, and forces the same through the evaporator 26b into the vertical passage 45. From the passage 45, the air passes rearwardly from the apparatus through the horizontal duct 46.

In order to prevent frost or ice from accumulating on the evaporator when the apparatus is used for tempered ventilating purposes, it is necessary that the surface temperature of the evaporator 26b be maintained above 32° F. at all times. The accumulation of frost or ice on the evaporator 26b would restrict and eventually stop the air flow through the evaporator and possibly damage it. In order to maintain the surface of the evaporator above 32° F., it is necessary that the temperature of the air entering the evaporator be sufficiently high to provide sufficient heat load to the evaporator. As the temperature of the air leaving the evaporator bears a certain relationship to the temperature of the air entering the evaporator in a unit of this type, the temperature of the leaving air may be employed as a means of controlling the entering air temperature through use of a suitable damper controlling the proportion of outside and inside air entering the evaporator, said damper being thermostatically operated and the temperature responsive element being placed in the air stream leaving the evaporator. For this purpose, the slide damper 23b is arranged to be moved in response to the temperature changes of the air leaving the evaporator coil 26b in such a manner as to regulate the proportion of inside and outside air drawn in by the evaporator fan 35b or to enable all outside air to be drawn in by that fan. For this purpose, a slide damper 23b has a bracket 52 which has a pin 53 riding in a longitudinally elongate slot 54 in an arm 55. The arm 55 is pivoted between its ends at 56 and is normally urged to a position closing the outside opening 22b by a spring 57. Engaging the opposite end of the arm 55 is a thermostatic bellows 58 which is anchored at one end within the cabinet and has a tube 59 communicating with a bulb 60 disposed in close relationship to the evaporator coil 26b and within the chamber 45. The bulb 60 may contain a suitable liquid which responds to temperature changes so that as the temperature of the air leaving the evaporator increases, the bellows 58 expands and overcomes the tension of the spring 57 to move the slide damper 23b in a direction to open the outside opening 22b and reduce the inside opening 19b. The converse action of the damper takes place when the temperature of the air leaving the evaporator decreases.

It will be understood that other forms of temperature responsive devices may be employed for actuating the slide damper. Furthermore, it will be understood that the slide damper may be actuated in response to temperature changes within the evaporator chamber, the refrigerant in the evaporator itself or the outside temperature, as will readily be apparent to those skilled in this art. By providing thermal responsive means to control the air drawn into the evaporator chamber, frosting of the evaporator 26b is overcome, thereby enabling the apparatus to be employed effectively as an air warming or tempering apparatus for introducing fresh tempered air into the room when the outside temperature is relatively low. A knob 24b enables the slide damper 23b to be operated manually, suitable means being afforded to retain the damper in the desired position of adjustment. In this instance, the knob 24b is in screw-threaded engagement with the stem carried by the damper 23b, the stem being adapted to ride in an elongated slot in a relatively narrow strip 61. The knob 24b is first loosened and then the damper 23b can be manually moved to the desired position, whereupon the knob is tightened upon its stem so as to hold it in place.

Figure 10:
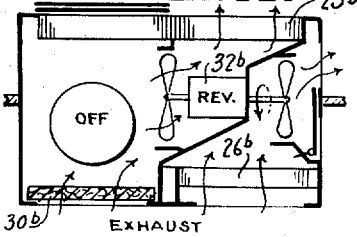
Figure 10 is a similar diagrammatic view showing the unit adjusted for exhausting air from the inside of the room.

In the form of the invention shown in Figure 10, the operation of the fan motor 32b is reversed and air is withdrawn from the room and discharged to the outside by operation of both of the fans. As above explained, the cooling apparatus is inoperative when the apparatus is used for exhausting purposes as well as when the apparatus is used solely for ventilating purposes.

From the above description, it will be apparent that we have produced a single unit for supplying to a room cool, dehumdified, fresh air, or which can be employed to introduce in sizable volume filtered outside air when the refrigerating machine is not operating, or which can be employed to exhaust from the room air in large volume or when desired, introduce into the room heated filtered outside air. It will be manifest that the unit is compact and the parts have been so arranged as to reduce to a minimum the size of the cabinet. The use of propeller type fans is of importance from a cost standpoint and it will be observed that neither fan is disposed closely to an opening or to an imperforate wall so that not only is the efficiency increased but the noise is reduced to a minimum. It will further be observed that the arrangement of the fans is such as to create an exceedingly uniform flow of air through all parts of the condenser and evaporator. By arranging the axes of the fans and the fan motor longitudinally of the cabinet, the depth of the cabinet is materially reduced. The removal of the condensate in a refrigerating machine of this character is of importance and the particular method of condensate removal in this apparatus makes possible the above described fan arrangement, and although the means of condensate removal is generally indicated on Figure 3 of the drawings, detailed description and further illustration is not considered necessary since the same is fully shown and described in our co-pending application Serial No. 303,966, filed November 13, 1939.

Another advantage of employing propeller type fans is that it makes possible the reversing feature above described. The arrangement of the fan motor as well as the motor-compressor unit in the condenser chamber militates against heated air being supplied to the space to be conditioned and both the fan motor and the motor compressor unit are so positioned that air currents from the condenser fan impart a cooling influence thereto.

It is to be understood that numerous changes in details of construction, operation and arrangement of parts may be effected without departing from the spirit of the invention especially as defined in the appended claims. The expressions "inside" and "outside" in the claims refer respectively to the room or space to be air-conditioned and to the space outside of the room or space to be conditioned. Furthermore, it is to be understood that the expressions "condenser chamber" and "evaporator chamber" as used in the claims is to define those chambers containing the evaporator or the condenser.

What we claim is:

1. In an air conditioning unit, a cabinet adapted to be disposed within a window opening, an opening at the front communicating with the inside of the space to be conditioned and an opening at the rear communicating with the outside, a cover for said cabinet, a partition separating the inside of the cabinet into two chambers and extending from a point substantially midway of the front opening diagonally toward one side of the cabinet, a refrigerating machine including an evaporator substantially covering the front opening of one chamber and a condenser substantially covering the rear opening of the other chamber, the evaporator chamber having side openings communicating respectively with the inside and outside of the space to be conditioned, a damper for said side openings adapted to uncover one or the other or a portion of each, a two way operating fan in each chamber, the condenser chamber fan being arranged normally to draw in outside air through a portion of the condenser and discharge same through another portion of the condenser, and concomitantly the evaporator chamber fan operating to draw in air and discharge same over the evaporator into the space to be conditioned, and a reversible motor for driving said fans, said fans being arranged to impart longitudinal thrusts in the same direction.

2. In an air conditioning unit, a cabinet adapted to be disposed within a window opening, an opening at the front communicating with the inside of the space to be conditioned and an opening at the rear communicating with the outside, a cover for said cabinet, a partition separating the inside of the cabinet into two chambers and extending from a point substantially midway of the front opening diagonally toward one side of the cabinet, a refrigerating machine including an evaporator substantially covering the front opening of one chamber and a condenser substantially covering the rear opening of the other chamber, the evaporator chamber having side openings communicating respectively with the inside and outside of the space to be conditioned, a damper for said side openings adapted to uncover one or the other or a portion of each, a two way operating fan in each chamber, the condenser chamber fan being arranged normally to draw in outside air through a portion of the condenser and discharge same through another portion of the condenser, and concomitantly the evaporator chamber fan operating to draw in air and discharge same over the evaporator into the space to be conditioned, and a reversible motor for driving said fans, said fans being constructed to impart longitudinal thrusts in opposite directions.

3. In an air conditioning unit, a cabinet adapted to be disposed within a window opening, an opening at the front communicating with the inside of the space to be conditioned and an opening at the rear communicating with the outside, a cover for said cabinet, a partition separating the inside of the cabinet into two chambers and extending from a point substantially midway of the front opening diagonally toward one side of the cabinet, a refrigerating machine including an evaporator substantially covering the front opening of one chamber and a condenser substantially covering the rear opening of the other chamber, the evaporator chamber having side openings communicating respectively with the inside and outside of the space to be conditioned, a damper for said side openings adapted to uncover one or the other or a portion of each, a two way operating fan in each chamber, the condenser chamber fan being arranged normally to draw in outside air through a portion of the condenser and discharge same through another portion of the condenser, and concomitantly the evaporator chamber fan operating to draw in air and discharge same over the evaporator into the space to be conditioned, and a reversible motor for driving said fans, said fans being constructed to impart longitudinal thrusts in opposite directions.

4. An air conditioning unit comprising a substantially rectangular casing adapted to be positioned in a window of a space to be conditioned, the front wall and at least a portion of the sides, bottom and top of said casing extending into the space to be conditioned, a vertical transverse partition dividing said casing into two chambers, one of the chambers having an outside opening at the rear end thereof and the other of the chambers having a front air outlet opening and a lateral air inlet opening, one of the chambers containing a motor-compressor unit, a fan, a motor for operating said fan and a condenser substantially co-extensive with said rear opening, the axes of said fan motor and fan being substantially parallel to said condenser, means including a shroud for said fan dividing said last chamber into two compartments whereby the fan is adapted to draw in air through one portion of the condenser and discharge the same through another portion of the condenser, the other of said chambers containing a fan, a shaft leading from said fan motor extending through said partition for operating said last fan, and an evaporator covering the front air outlet and arranged substantially parallel to said condenser.

5. An air conditioning unit comprising a casing adapted to be positioned in a window of a space to be conditioned, a portion of said casing being disposed on the inside and another portion on the outside of the window, a vertical transverse partition extending from a point substantially centrally of the front wall of the casing and terminating at a point adjacent the rear end of one of the side walls thereof thereby dividing the casing into two chambers, one of the chambers having an outside opening and the other of the chambers having outlet and inlet openings, said first chamber containing a motor-compressor unit, a fan, a motor for operating said fan, and a condenser covering the outside opening of said one chamber, said fan and fan motor having their axes substantially parallel to the condenser, the other of said chambers containing a fan having its axis in alignment with said first fan and operatively connected to said fan motor, said second fan being arranged to draw in air through said inlet opening and discharge same through said outlet opening over the evaporator, and an evaporator substantially covering said air outlet opening and arranged substantially parallel to said condenser, and means in said first chamber associated with said first fan for dividing same into two compartments, whereby air is drawn in through one portion of the condenser and discharged through another portion of the condenser.

6. An air conditioning and ventilating unit comprising a cabinet having separate evaporator and condenser chambers, the evaporator chamber being provided with an air inlet and an opening communicating with the inside of the space to be conditioned, the condenser chamber having an opening communicating with the inside of the space to be conditioned and an opening communicating with the outside of said space, a refrigerating apparatus including an evaporator in the evaporator chamber and a condenser in the condenser chamber, means for circulating air through said evaporator chamber, reversible air forcing means in the condenser chamber arranged when driven in one direction to draw outside air through said outside condenser chamber opening and through a portion of said condenser and to discharge such air through said inside condenser chamber opening, and when driven in the opposite direction to draw inside air through said inside condenser chamber opening and discharge such inside air through said outside condenser chamber opening, and baffle means adjustable to cooperate with said air forcing means to direct air from the outside over said portion of said condenser into the condenser chamber and back to the outside over another portion of said condenser when said reversible air forcing means is operating in the first mentioned direction.

7. An air conditioning and ventilating unit comprising a cabinet having separate evaporator and condenser chambers, the evaporator chamber being provided with an air inlet and an opening communicating with the inside of the space to be conditioned, the condenser chamber having an opening communicating with the inside of the space to be conditioned and an opening communicating with the outside of said space, a refrigerating apparatus including an evaporator in the evaporator chamber and a condenser in the condenser chamber, reversible air forcing means in the condenser chamber arranged when driven in one direction to draw outside air through said outside condenser chamber opening and through a portion of said condenser and to discharge such outside air through said inside condenser chamber opening, and when driven in the opposite direction to draw inside air through said inside condenser chamber opening and discharge such inside air through said outside condenser chamber opening, baffle means adjustable to cooperate with said air forcing means to direct air from the outside over said portion of said condenser into the condenser chamber and back to the outside over another portion of said condenser when said reversible air forcing means is operating in the first mentioned direction, and a fan in said evaporator chamber operatively connected to said reversible air forcing means for forcing air from said evaporator inlet through said inside evaporator opening to the inside of the space to be conditioned or upon operation of said reversible air forcing means in the opposite direction to force air through said evaporator chamber in the opposite direction.

8. An air conditioning unit comprising a cabinet having an evaporator chamber and a condenser chamber, each communicating with the outside and inside of the space to be conditioned, a refrigerating apparatus within said cabinet including an evaporator in said evaporator chamber, a condenser and a motor-compressor unit in said condenser chamber, reversible air forcing means in said cabinet for forcing air through said condenser chamber from the outside to the inside when said air forcing means is operating in one direction and from the inside to the outside when said reversible means is operating in the opposite direction, and baffle means in said condenser chamber adjustable to cooperate with said air forcing means to direct air from the outside into said condenser chamber and back to the outside when said reversible air forcing means is operating in the first mentioned direction.

9. In an air conditioning unit, a cabinet adapted to be disposed within a window opening, an opening at the front communicating with the inside of the space to be conditioned and an opening at the rear communicating with the outside, a partition separating the inside of the cabinet into two chambers and extending from a point substantially midway of the front opening diagonally toward one side of the cabinet, a refrigerating machine including an evaporator substantially covering the front opening of one chamber and a condenser substantially covering the rear opening of the other chamber, the evaporator chamber having side openings communicating respectively with the inside and outside of the space to be conditioned, a damper for said side openings adjustable to uncover one or the other or a portion of each, a fan in each chamber, the condenser chamber fan being arranged normally to draw in outside air through a portion of the condenser and discharge same through another portion of the condenser to the outside of the space to be conditioned, a motor common to said fans and arranged in the condenser chamber, and baffle means in said condenser chamber adjustable to cooperate with said condenser chamber fan to discharge air through the front opening of the condenser chamber.

10. In an air conditioning unit, a cabinet adapted to be disposed within a window opening, an opening at the front communicating with the inside of the space to be conditioned and an opening at the rear communicating with the outside, a partition separating the inside of the cabinet into a condenser chamber and an evaporator chamber and extending from a point substantially midway of the front opening diagonally toward one side of the cabinet, a refrigerating machine including an evaporator substantially covering the front opening of the evaporator chamber and a condenser substantially covering the rear opening of the condenser chamber, the evaporator chamber having side openings communicating respectively with the inside and outside space to be conditioned, a damper for said side opening adapted to uncover one or the other or a portion of each, there being a front opening for the condenser chamber in alignment with said evaporator, a filter covering said front condenser chamber opening, a two-way operating fan in each chamber, the condenser chamber fan being arranged normally to draw in outside air through a portion of the condenser and discharge same through another portion of the condenser, a reversible motor common to said fans, and baffle means in said condenser chamber adjustable to cooperate with said condenser chamber fans to discharge air through the front opening of the condenser chamber.

11. In an air conditioning unit, a cabinet adapted to be disposed within a window opening, an opening at the front communicating with the inside of the space to be conditioned and an opening at the rear communicating with the outside, a partition separating the inside of the cabinet into two chambers and extending from a point substantially midway of the front opening diagonally toward one side of the cabinet, a refrigerating machine including an evaporator substantially covering the front opening of one chamber and a condenser substantially covering the rear opening of the other chamber, the evaporator chamber having side openings communicating respectively with the inside and outside of the space to be conditioned, a damper for said side openings adjustable to uncover one or the other or a portion of each, a two-way operating fan in each chamber, the condenser chamber fan being arranged normally to draw in outside air through a portion of the condenser and discharge same through another portion of the condenser, the evaporator chamber fan being arranged normally to draw air through one or both of said side openings and discharge such air through said front opening, and a reversible motor common to said fans.

12. In an air conditioning unit, a cabinet having an evaporator chamber, an evaporator of a refrigerating apparatus in said chamber, openings in said chamber communicating respectively with the inside and outside of the space to be conditioned, a passageway providing an additional communication between said chamber and the outside of the space to be conditioned, a closure for said passageway, and temperature responsive means for closing one or the other of said openings or partially uncovering both of said openings.

13. An air conditioning unit comprising a casing adapted to be positioned in a window of a space to be conditioned, a portion of said casing being disposed on the inside and another portion on the outside of the window, a vertically arranged transversely disposed partition dividing said casing into two chambers, one of the chambers having an outside opening at the rear end thereof and the other chamber having a front air outlet opening and a pair of air inlet openings communicating respectively with the inside and outside of the space to be conditioned, a damper common to said air inlet openings and adjustable to close one or the other, one of the chambers containing a motor-compressor unit, a fan, a motor for operating said fan, and a condenser substantially co-extensive with said rear opening, the axes of said fan motor and fan being substantially parallel to said condenser, means including a shroud for said fan dividing said last chamber into two compartments whereby the fan is adapted to draw in air through one portion of the condenser and discharge the same through another portion of the condenser, the other of said chambers containing a fan, a shaft leading from said fan motor extending through said partition for operating said last fan, and an evaporator covering the front air outlet opening and arranged substantially parallel to said condenser.

14. An air conditioning unit comprising a casing adapted to be positioned in a window of a space to be conditioned, a portion of said casing being disposed on the inside and another portion on the outside of the window, a vertically arranged transversely disposed partition dividing said casing into two chambers, one of the chambers having an outside opening at the rear end thereof and the other chamber having a front air outlet opening and a pair of air inlet openings communicating respectively with the inside and outside of the space to be conditioned, damper means for controlling the flow of air through said air inlet openings, one of the chambers containing a motor-compressor unit, a fan, a motor for operating said fan, and a condenser substantially co-extensive with said rear opening, the axes of said fan motor and fan being substantially parallel to said condenser, means including a shroud for said fan dividing said last chamber into two compartments whereby the fan is adapted to draw in air through one portion of the condenser and discharge the same through another portion of the condenser, the other of said chambers containing a fan, a shaft leading from said fan motor extending through said partition for operating said last fan, and an evaporator covering the front end outlet opening and arranged substantially parallel to said condenser.

15. Air conditioning apparatus comprising in combination, a cabinet adapted to be mounted on the window sill of a room, means for dividing said cabinet into a condenser compartment and an evaporator compartment, an evaporator in said evaporator compartment, a condenser in said condenser compartment, a refrigerant compressor within said condenser compartment, refrigerant flow connections between said condenser, evaporator and compressor, said evaporator compartment having one opening communicating with the room to be conditioned and having another opening communicating with the outside of said room, said condenser compartment having an opening communicating with said room and having another opening communicating with the outside of said room, an evaporator fan for circulating air in through one of said evaporator compartment openings and out through the other of said evaporator compartment openings, fan means for circulating air in through one of said condenser compartment openings and out through the other of said condenser compartment openings, and means for reversing the direction of rotation of said air circulating fans.

16. Air conditioning apparatus comprising in combination, a cabinet adapted to be mounted on the window sill of a room, means for dividing said cabinet into a condenser compartment and an evaporator compartment, an evaporator in said evaporator compartment, a condenser in said condenser compartment, a refrigerant compressor within said condenser compartment, refrigerant flow connections between said condenser, evaporator and compressor, said evaporator compartment having one opening communicating with the room to be conditioned and having another opening communicating with the outside of said room, said condenser compartment having an opening communicating with said room and having another opening communicating with the outside of said room, an evaporator fan for circulating air in through one of said evaporator compartment openings and out through the other of said evaporator compartment openings, fan means for circulating air in through one of said condenser compartment openings and out through the other of said condenser compartment openings, a common operating means for said air circulating fans, and means for reversing the direction of said operating means.

17. Air conditioning apparatus comprising in combination, a cabinet adapted to be mounted on the window sill of a room, means for dividing said cabinet into a condenser compartment and an evaporator compartment, an evaporator in said evaporator compartment, a condenser in said condenser compartment, a refrigerant compressor within said condenser compartment, refrigerant flow connections between said condenser, evaporator and compressor, said evaporator compartment having one opening communicating with the room to be conditioned and having another opening communicating with the outside of said room, said condenser compartment having an opening communicating with said room and having another opening communicating with the outside of said room, evaporator fan means for circulating air in through one of said evaporator compartment openings and out through another of said evaporator compartment openings, condenser fan means for circulating air in through one of said condenser compartment openings and out through the other of said condenser compartment openings, means for reversing the direction of rotation of both of said fan means, and means for causing more air to enter said room through said unit than is discharged from said room through said unit.

18. The method of conditioning air for an enclosure which comprises operating one air propelling means so as to propel one stream of air into said enclosure and operating another air propelling means so as to propel another stream of air out of said enclosure, evaporating a volatile liquid refrigerant in thermal exchange with one of said streams so as to vaporize said refrigerant and cool said stream of air, condensing the vaporized refrigerant in thermal exchange with the other of said streams so as to heat said other stream, and reversing the direction of flow of said streams by reversing the direction of operation of the air propelling means.

19. An air conditioning unit for a room comprising in combination, a casing, means for dividing said casing into an evaporator compartment and a condenser compartment, said condenser compartment having an opening communicating with said room and an opening communicating with the outside, said evaporator compartment having an opening communicating with the outside and an opening communicating with said room, a refrigerating system including an evaporator in said evaporator compartment and a condenser in said condenser compartment, blower means for normally flowing room air over said condenser to the outside, a second blower means for normally flowing fresh air over said evaporator and into said room, means for reversing the direction of rotation of both of said blower means, and means for admitting outside air to the evaporator compartment when said blower means are operating in reverse.

20. An air conditioning unit for a room comprising in combination, a casing, means for dividing said casing into an evaporator compartment and a condenser compartment, said condenser compartment having an opening communicating with said room and an opening communicating with the outside, said evaporator compartment having an opening communicating with the outside and an opening communicating with said room, a refrigerating system including an evaporator in said evaporator compartment and a condenser in said condenser compartment, blower means for normally flowing room air over said condenser to the outside, a second blower means for normally flowing fresh air over said evaporator and into said room, means for reversing the direction of rotation of one of said blower means, and means for admitting outside air to the evaporator compartment when said one blower means is operating in reverse.

21. In an air conditioning unit, a cabinet adapted to be disposed within a window opening, a refrigerant evaporator within said cabinet, refrigerant liquefying apparatus within said cabinet for supplying liquid refrigerant to said evaporator, opening means in said cabinet having one portion communicating with the inside and having another portion communicating with the outside of the space to be conditioned, a movable control plate smaller than said opening means for closing one or the other of said portions or partially uncovering both of said portions, and means for mounting said control plate adjacent said opening means, said control plate and said portions being so constructed and arranged that the control plate may be shifted to vary the relative amounts of air passing through the opening means on opposite sides of the control plate without materially varying the amount of air entering the cabinet through said opening means.

22. In an air conditioning unit, a cabinet adapted to be disposed within a window opening in a wall of an enclosure with one portion projecting into the enclosure and another portion projecting outside the enclosure, air conditioning apparatus within said cabinet, said cabinet having a pair of adjacent air inlet openings in one wall thereof so as to communicate respectively with the inside and outside of said enclosure, a slide damper for uncovering one or the other or a portion of each of said openings, and means for slidably supporting said damper adjacent said openings.

23. An air conditioning unit comprising a substantially rectangular casing adapted to be positioned in a window of a space to be conditioned, the front wall and at least a portion of the sides, bottom and top of said casing extending into the space to be conditioned, a partition dividing said casing into two chambers, one of said chambers having an outside opening and the other of the chambers having an air outlet opening and an air inlet opening, one of the chambers containing a motor-compressor unit, a fan, a motor for operating said fan, and a condenser substantially coextensive with said outside opening, the axis of said fan motor and fan being substantially parallel to said condenser, means including a shroud for said fan dividing said last chamber into two compartments whereby the fan is adapted to draw in air through one portion of the condenser and to discharge the same through another portion of the condenser, the other of said chambers containing a fan, a shaft leading from said fan motor extending through said partition for operating said last fan, and an evaporator arranged substantially parallel to said condenser.

24. An air conditioning unit comprising a cabinet having an evaporator chamber and a condenser chamber, refrigerating apparatus within said cabinet including an evaporator in said evaporator chamber and a condenser within said condenser chamber, said cabinet having an air inlet and an air outlet for each of said chambers, said evaporator and said condenser being spaced from one another and being arranged in substantially parallel opposed relationship to one another, and a pair of propeller type fans mounted on a common shaft located immediately between the condenser and the evaporator for flowing air over the condenser and the evaporator respectively, said shaft being arranged substantially parallel to the opposed sides of said condenser and said evaporator.

25. An air conditioning and ventilating unit comprising a cabinet having separate evaporator and condenser chambers, the evaporator chamber being provided with an air inlet and an opening communicating with the inside of the space to be conditioned, the condenser chamber having an opening communicating with the inside of said space and having opening means communicating with the outside of said space, a refrigerating apparatus including an evaporator in the evaporator chamber and a condenser in the condenser chamber, means for circulating air through said evaporator chamber, reversible air forcing means in the condenser chamber arranged when driven in one direction to draw outside air through said outside condenser chamber opening means and through at least a portion of said condenser and to discharge such air through said inside condenser chamber opening, and when driven in the opposite direction to draw air through said condenser chamber and discharge such air through said outside condenser chamber opening means.

26. An air conditioning unit comprising a cabinet having an evaporator chamber and a condenser chamber, each communicating with the outside and inside of the space to be conditioned, a refrigerating apparatus within said cabinet including an evaporator in said evaporator chamber, a condenser and a motor-compressor unit in said condenser chamber, reversible air forcing means in said cabinet and forcing air through said condenser chamber from the outside to the inside when said air forcing means is operating in one direction and from the inside to the outside when said reversible means is operating in the opposite direction.

27. The method of maintaining the temperature in an enclosure between the upper and lower limits of a pre-determined range over an extended period of time, comprising moving refrigerant through a closed circuit, evaporating refrigerant in one part of said circuit to produce a refrigerating effect in a zone surrounding said one part, liquefying refrigerant in another part of said circuit to produce a heating effect in a second zone surrounding said other part, operating an air propelling means in one direction and thereby circulating air from said first mentioned zone into said enclosure and from said second mentioned zone into the atmosphere exterior of said enclosure when the temperature of the air in said enclosure is above said upper limit, reversing the direction of rotation of said air propelling means when the temperature of the air in said enclosure falls below said lower limit and directing the air from said second mentioned zone into said enclosure and directing the air from the first mentioned zone into said exterior atmosphere.

28. Air conditioning apparatus comprising in combination, a cabinet adapted to be mounted on the window sill of a room, means for dividing said cabinet into a condenser compartment and an evaporator compartment, an evaporator in said evaporator compartment, a condenser in said condenser compartment, a refrigerant compressor within said condenser compartment, refrigerant flow connections between said condenser, evaporator and compressor, said evaporator compartment having one opening adapted to communicate with said room and having another opening adapted to communicate with the outside of said room, said condenser compartment having an opening adapted to communicate with said room and having another opening adapted to communicate with the outside of said room, an evaporator fan for circulating air in through said evaporator compartment and out through one of said evaporator compartment openings, fan means for circulating air in through said condenser compartment and out through one of said condenser compartment openings, and means for reversing the direction of rotation of said air circulating fans.

MATSON C. TERRY.
PAUL KOMROFF.